UNITED STATES PATENT OFFICE.

MELCHIOR BÖNIGER, OF BASLE, SWITZERLAND, ASSIGNOR TO CHEMISCHE FABRIK, VORMALS SANDOZ, OF SAME PLACE.

BLUE DYE.

SPECIFICATION forming part of Letters Patent No. 584,981, dated June 22, 1897.

Application filed March 5, 1897. Serial No. 626,008. (Specimens.)

*To all whom it may concern:*

Be it known that I, MELCHIOR BÖNIGER, chemist, residing at Basle, Switzerland, have invented new and useful Improvements in the Manufacture of Blue Dyestuffs, of which the following is a specification.

The disazo coloring-matters described in the German Letters Patent No. 58,076, derived from one molecule of the tetrazo compound of a paradiamin and two molecules of the 1. naphthol 3.6.8 trisulfonic acid described in the German Letters Patent No. 56,058 and United States Patent No. 473,467 are, although of bright shade, not adapted for dyeing unmordanted cotton, the accumulation of the sulfo groups having destroyed the affinity to the cotton fiber.

Now I have found that good direct dyeing colors for cotton are obtained by combining tetrazo bodies of paradiamins, such as benzidin, tolidin, dianisidin, with only one molecule of the above-mentioned naphthol trisulfonic acid and by combining the intermediate product afterward with one molecule of beta-naphthol. The dyestuffs so produced are superior in solubility and brightness of shade to the analogue disazo colors obtained from tetrazo bodies, one molecule of naphthol disulfonic acids and one molecule of beta-naphthol.

In carrying out my invention I proceed as follows:

Example.—24.4 kilograms of dianisidin are dissolved in three hundred liters of water acidulated with fifty-eight kilograms of muriatic acid of 21° Baumé and then diazotized in the usual manner at a temperature between 0° and 5° centigrade, adding 13.8 kilograms of nitrite of soda. Thereupon forty-five kilograms of the trisodium salt of the 1. naphthol 3.6.8 trisulfonic acid dissolved in eight hundred liters of water and cooled to 0° centigrade are poured into the solution of the tetrazo compound, formed as before described, and while stirring well the mixture is rendered alkaline with thirty-five kilograms of calcined soda dissolved in two hundred and fifty liters of water. The intermediate compound is formed instantaneously as a blue reddish solution. After having stirred well about three to five minutes a cold solution prepared from 14.4 kilograms of beta-naphthol and four kilograms of caustic soda in one hundred liters of water is introduced into the thus-formed diazo compound. The blue reddish color of the solution turns then into pure blue. After some hours standing the new coloring-matter is precipitated by heating under steam-pressure and addition of common salt until a boiling-point of 110° centigrade is reached. The hot product is then filtered, pressed, and dried.

The coloring-matter thus produced is in the form of a bronze shade powder, dyeing unmordanted cotton in a boiling-salt or Glauber-salt bath (which may be rendered slightly alkaline by addition of soda, soap, or phosphate of soda) in bright blue shades ranging between those of diamin-blue $2^B$ and $3^B$. The coloring-matter dissolves easily in water with pure blue shade, which is not altered by addition of soda, but turns reddish violet by addition of caustic soda. It is further easily soluble in methylic, but very weakly in ethylic, alcohol, in both cases with violet color, and dissolves in strong sulfuric acid with a greenish-blue shade. By dilution with water the violet sulfo-acid of the coloring-matter is precipitated. Reducing agents destroy the color, forming dianisidin and alpha-amido-beta-naphtol besides an easily-soluble sulfo-acid.

Having thus described my invention, what I claim, and desire to secure by Letters Patent, is—

1. The process of producing a blue coloring-matter by combination of one molecule of the tetrazo compound of dianisidin in an alkaline-soda solution with one molecule of 1. naphthol 3.6.8 trisulfonic acid and combining the intermediate product thus formed with one molecule of beta-naphthol substantially as specified.

2. As a new article of manufacture the blue coloring-matter consisting of a combination of one molecule of the tetrazo compound of dianisidin with one molecule of 1 naphtol 3.6.8 trisulfonic acid and one molecule beta-naphthol and being a bronze shade powder, soluble easily in water with a pure blue shade which is not altered by addition of soda but turns reddish violet on the addition of caustic soda, soluble easily in methylic but very weakly in ethylic alcohol in both cases with violet color, dissolving in strong sulfuric acid with a greenish-blue shade, dyeing unmordanted cotton in a boiling-salt or Glauber-salt bath in bright blue shades, substantially as described.

In testimony whereof I have signed my name to this specification in the presence of two subscribing witnesses.

MELCHIOR BÖNIGER.

Witnesses:
ARNOLD STEINER,
ALBERT BILLETER.